United States Patent [19]
Doodson

[11] Patent Number: 5,890,590
[45] Date of Patent: Apr. 6, 1999

[54] HOUSING FOR A DISC-SHAPED INFORMATION CARRIER

[75] Inventor: Peter J. Doodson, Eindhoven, Netherlands

[73] Assignee: U.S. Philips Corporation, New York, N.Y.

[21] Appl. No.: 30,493

[22] Filed: Feb. 25, 1998

[30] Foreign Application Priority Data

Sep. 26, 1997 [EP] European Pat. Off. .............. 97202965

[51] Int. Cl.$^6$ .................................................. B65D 85/57
[52] U.S. Cl. ...................... 206/308.1; 206/309; 220/336
[58] Field of Search ................... 206/232, 308.1, 206/309, 310, 311, 312, 313; 220/336, 337, 338, 340

[56] References Cited

U.S. PATENT DOCUMENTS 5,590,767  1/1997  Li .......................................... 206/308.1
5,803,251  9/1998  Gartz ..................................... 206/308.1

FOREIGN PATENT DOCUMENTS 8523194  11/1985  Germany .

Primary Examiner—Jacob K. Ackun
Attorney, Agent, or Firm—David R. Treacy

[57] ABSTRACT

A housing for storing a disc-shaped information carrier, for example a DVD. The housing is provided with a bottom part (1) with a retaining device (7) for the information carrier and a lid part (3) which is connected with hinging possibility to the bottom part. Two corner hinges form the connection here, which corner hinges comprise two recessed hinge arms (30) of the hinge part and two matching recessed hinge walls (36). The lid part is provided with protection walls (42) which extend at the outside of the housing substantially parallel to the hinge arms so as to protect the hinge arms from external mechanical influences.

20 Claims, 4 Drawing Sheets

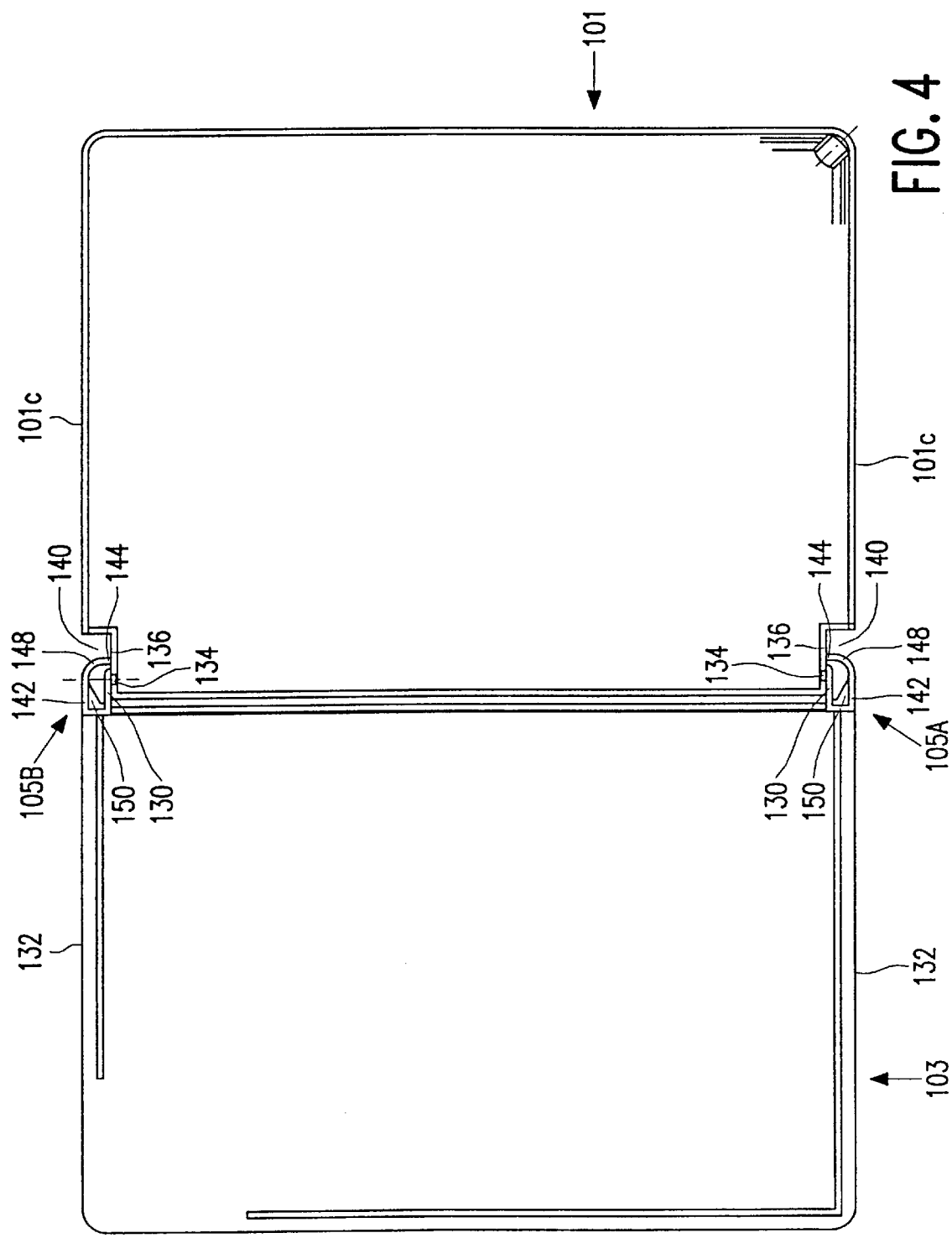

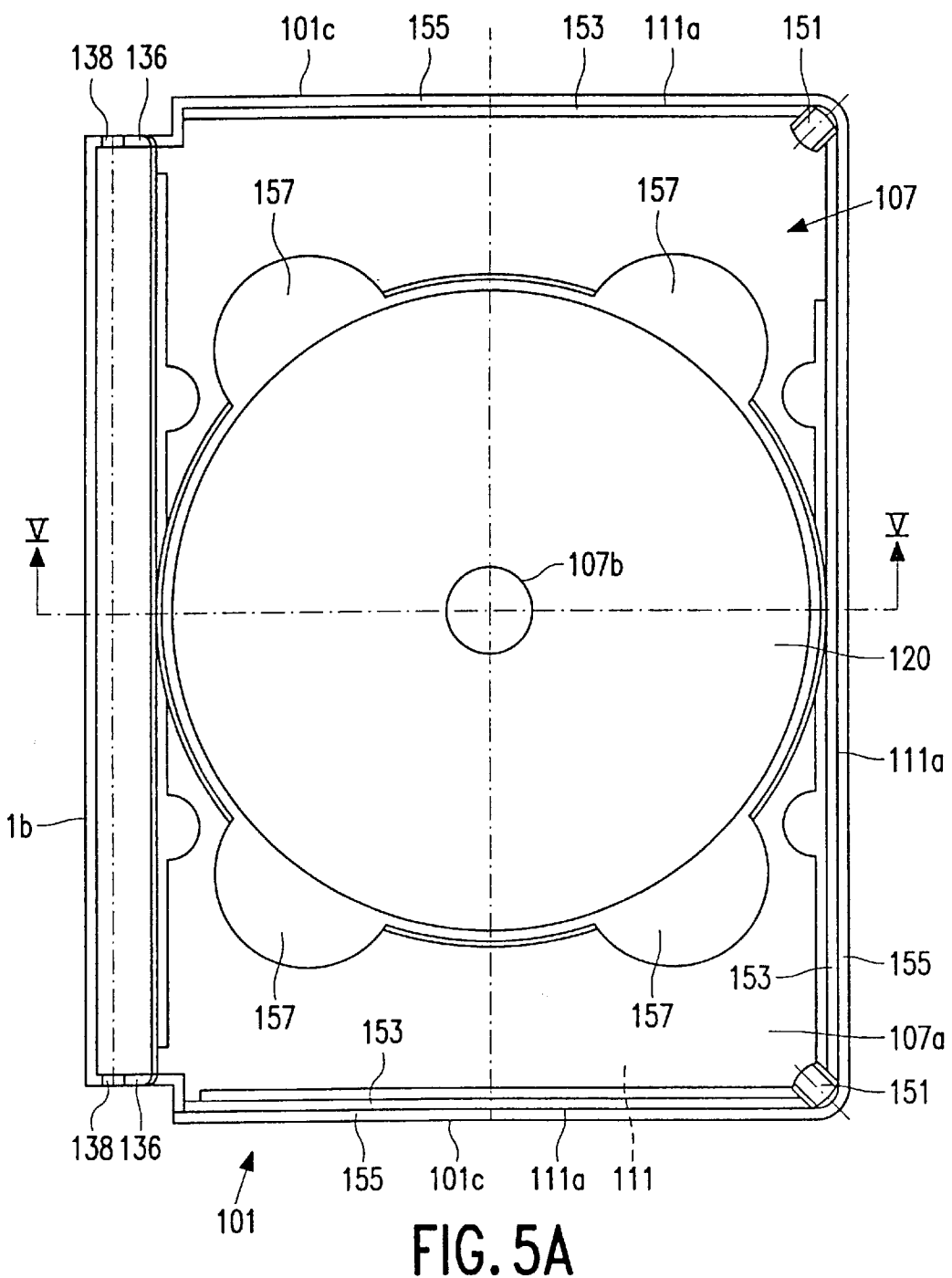

HOUSING FOR A DISC-SHAPED INFORMATION CARRIER

BACKGROUND OF THE INVENTION

The invention relates to a housing for storing a disc-shaped information carrier, provided with a bottom part, a retaining device present in the bottom part for retaining the information carrier, and a lid part connected to the bottom part by means of two corner hinges.

Such a housing is known from DE-U 8523194. The known housing is designed for the storage of optically scannable discs and has a box-type bottom part with high vertical side walls and a lid part with side walls. The latter side walls have a smaller mutual interspacing than do the vertical side walls of the bottom part. The lid part is connected to the bottom part with hinging possibility, the side walls of the lid part extending between the vertical side walls of the bottom part in a hinge region. A hinging device is created by means of two studs which are applied to the side walls of the one part and which project through openings of the side walls of the other part. A disadvantage of the known housing is that the hinging device is comparatively vulnerable to external mechanical influences.

SUMMARY OF THE INVENTION

The invention has for its object to provide a housing of the kind mentioned in the opening paragraph which is provided with a hinging device which is less vulnerable than the known device.

The housing according to the invention is for this purpose characterized in that the lid part is provided with two recessed hinge arms which are each recessed with respect to a lateral side of the lid part, and the bottom part is provided with two corner recesses which match the recessed hinge arms and in which the hinge arms extend, said corner recesses being bounded by recessed hinge walls which are each recessed with respect to a lateral side of the bottom part, while the recessed hinge arms are coupled with rotation possibility to the recessed hinge walls for forming said corner hinges, and in that the lid part is provided with two protection walls, each present opposite a respective hinge arm, which extend substantially at the lateral sides of the lid part. Owing to the special positioning of the hinge arms and the hinge walls, the corner hinges formed lie as it were recessed with respect to the lateral contours of the housing formed by the lateral sides of the bottom part and the lid part. The corner hinges are in addition protected by the protection walls which are present, extending along the hinge walls. As a result of this, the housing, more in particular the hinge device thereof thus obtained, is more resistant to mechanical external influences caused by, for example, dropping or impacts, than is the known housing. The housing according to the invention is suitable for storing disc-shaped information carriers such as optical or magneto-optical discs, for example provided with audio, video, or data information.

A preferred embodiment of the housing according to the invention has the characteristic that for each corner hinge either the hinge arm or the hinge wall is provided with a stud which projects into an opening in the other part of the hinge. The hinge arms and the hinge walls are thus coupled to one another with hinging possibility in a simple and reliable manner which is known per se. To facilitate the fastening of the lid to the bottom part, the hinge arms are preferably resilient in directions towards one another that is, along a line extending between the two arms; and/or away from one another, whereas the hinge walls are rigid. The studs or round pins are preferably present on the hinge arms and can be easily inserted into the openings, which are present in the hinge walls in this case, during the assembling process of the housing. After assembly, the resilient hinge arms ensure that the studs remain locked in the openings. The bottom part is usually given a box shape and is provided with vertical side walls. The recessed hinge walls are preferably formed by wall portions shifted to the inside with respect to said side walls in such a bottom part.

Another embodiment of the housing according to the invention is characterized in that the protection walls are of a resilient construction. A somewhat yielding, and accordingly particularly effective protection of the corner hinges is achieved thereby. The protection walls are preferably resilient in directions towards one another and away from one another.

An embodiment in which the protection walls extend entirely within the outer contours of the housing is characterized in that the protection walls extend in the corner recesses of the bottom part. The protection walls preferably lie in the extended directions of the side walls of the bottom part in the case of a bottom part having a box shape.

Yet another embodiment of the housing according to the invention has the characteristic that the protection walls are each provided with a free end portion, the free end portions being bent toward each other and each extending opposite and spaced a distance from a free end of one of the hinge arms. This provides a maximum protection for the corner hinges.

Still another embodiment of the housing according to the invention has the characteristic each of the protection walls is provided with a fluent bend portion which merges into the end portion and which forms a rounded transition between one of the lateral sides of the bottom part and a rear side of the bottom part at least when the lid part is in a closed position. The round transitions thus obtained are a desirable way to provide rounded angles at the corner portions of the housing adjacent the corner hinges. Rounded angles render the housing more customer-friendly on account of the absence of sharp corner portions and are better resistant to damage than are sharp angles. Preferably, therefore, all corners of the housing are rounded-angle corners.

An embodiment of the housing according to the invention is characterized in that the lid part is constructed as one product, in particular an injection-moulded product. The bottom part preferably also is one injection-moulded product. This renders possible a simple manufacture of the housing, including the hinging device. The housing is preferably made from a transparent material so as to maximize the possibility of accommodating information in the housing which is legible from the outside.

It is noted that embodiments of the housing according to the invention are also possible which are provided with a combination of measures as used in the various embodiments described above.

The invention will be explained in more detail by way of example with reference to the drawing.

BRIEF DESCRIPTION OF THE DRAWING

FIG. 4 is a plan view of a second embodiment of the housing according to the invention, comprising a bottom part and a lid part in an opened state, FIG. 5A is a plan view showing the bottom part of the second embodiment, provided with a retaining device, and FIG. 5B shows said bottom part in a cross-section taken on the line V—V in FIG. 5A.

DESCRIPTION OF THE PREFERRED EMBODIMENT

Figure 1:
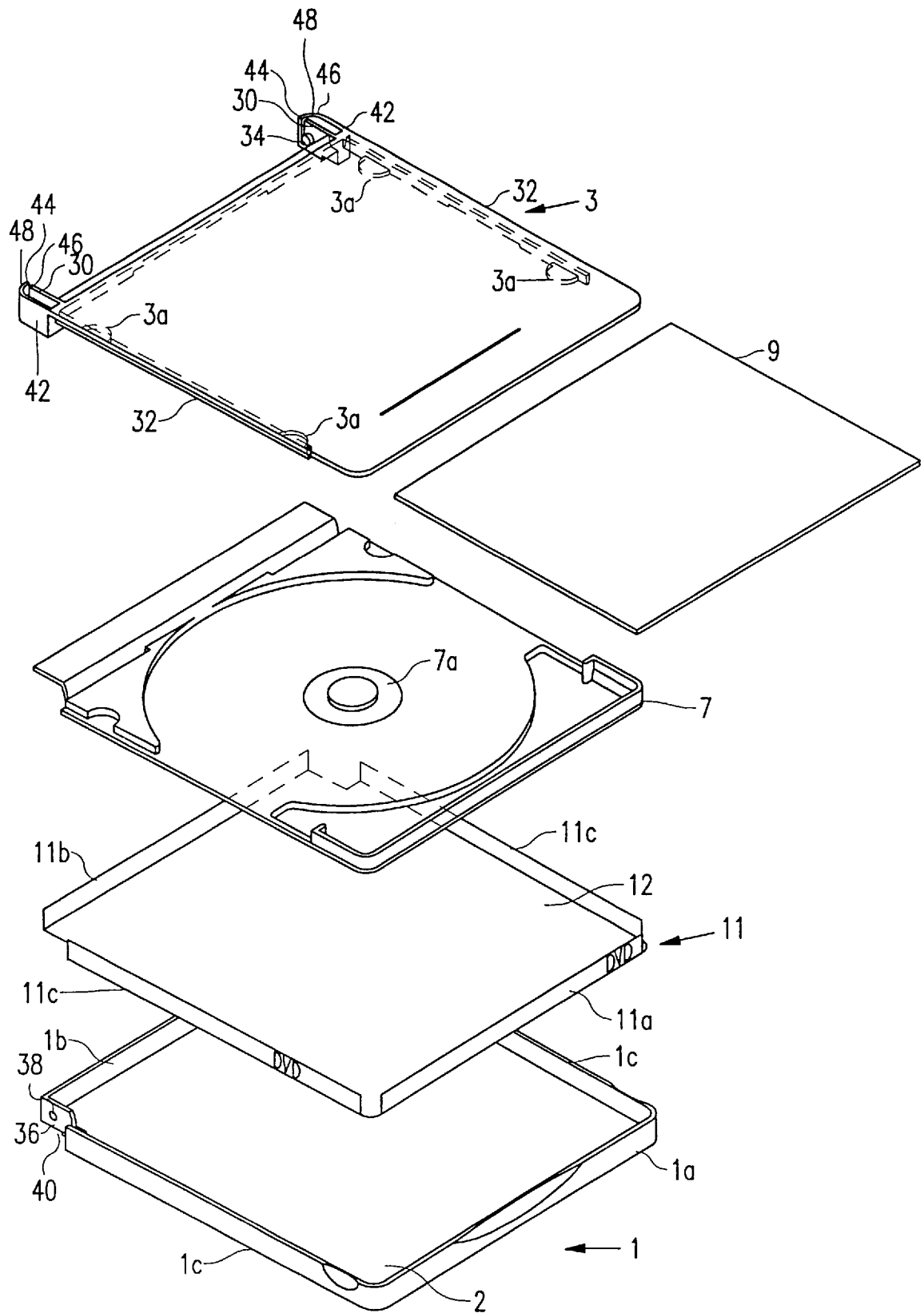
FIG. 1 is an exploded view of a first embodiment of the housing according to the invention.
Figure 2:
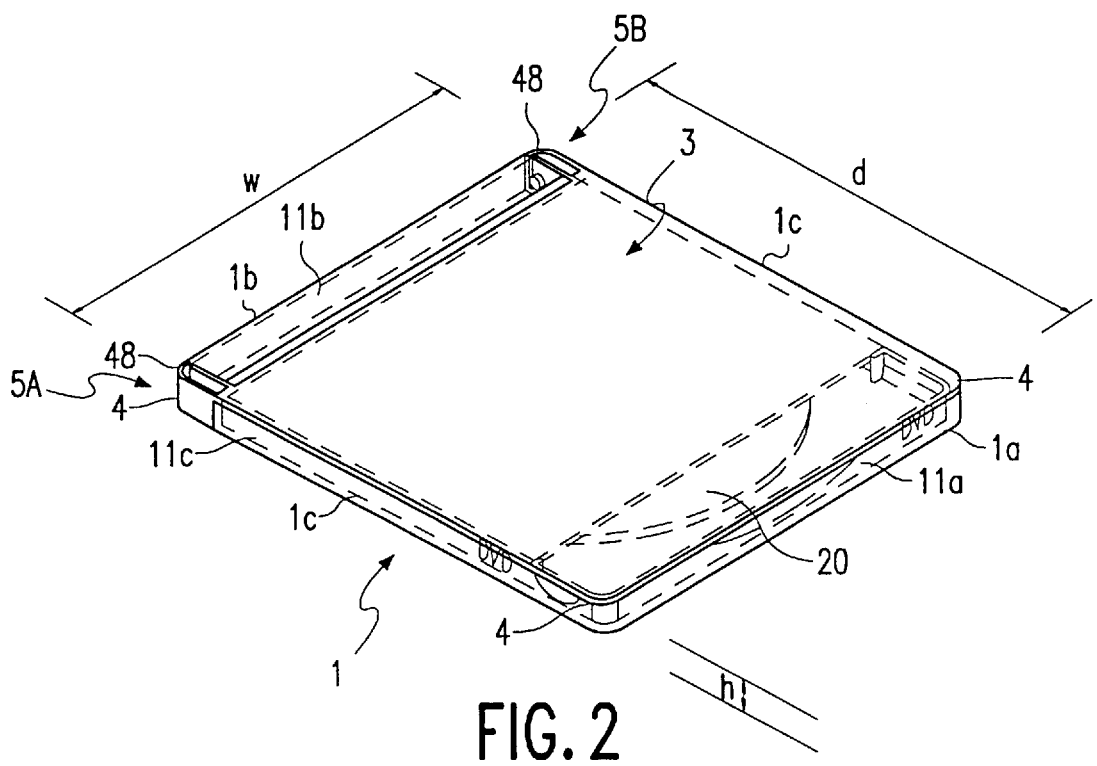
FIG. 2 is a perspective view of the first embodiment in a closed state.

The housing according to the invention shown in FIGS. 1 and 2 is suitable for the storage of an optical information carrier 20, in this example a DVD provided with audio information. Such an information carrier has one or several optically writable and/or readable information layers and is provided with a central opening. The housing, which is constructed in two parts, comprises a bottom part 1 and a lid part 3 which are interconnected with hinging possibility by means of corner hinges 5A and 5B. The bottom part 1 comprises a retaining device 7, in this example an inlay tray, with a central clamping device 7a for retaining the information carrier with clamping force, such that the central clamping device 7a projects into the central opening of the information carrier in the clamped state. The retaining device may also form an integral portion of the bottom part in an alternative embodiment.

The bottom part 1 has a box shape, is open at one side, and is provided with a bottom wall 2, a front wall 1a, and a rear wall 1b which are perpendicular to the bottom wall 2, and two side walls 1c which are perpendicular to the bottom wall 2. The front wall 1a, the rear wall 1b, and the side walls 1c, which all have the same height, are transparent and substantially uninterrupted over at least the major portion of their length. In this example, the bottom wall 2 is also transparent. The rear wall 1b forms a rear end of the housing, adjacent which rear end the hinges 5A and 5B are present. The lid part 3 substantially has a plate shape, is transparent, and in the present example is provided with tags 3a at the side facing the bottom part 1 for retaining an inserted document such as an information booklet or leaflet 9. In this example, the housing has external dimensions which correspond to those of the generally known CD dual box, i.e. a depth d of 142 mm, a width w of 124 mm, and a height h of 10 mm, but here the housing is provided with rounded corners 4.

An insert 11 is present in the housing according to the invention, extending in the bottom part 1, in particular on the bottom wall 2. The insert 11 in this example comprises four upright portions, i.e. a portion 11a extending opposite the front wall 1a, a portion 11b extending opposite the rear wall 1b, and two portions 11c extending opposite the side walls 1c. The sides of the upright portions 11a, 11b, and 11c facing the transparent walls 1a, 1b and 1c are provided with printed information relating to the information carrier 20 belonging to the housing. The upright portions 11a, 11b, and 11c preferably form an integral whole with a main portion 12 of the insert and are bent relative to the latter about folding lines. The insert 11 may be made from paper, from a synthetic resin, or from some other suitable material.

As is apparent from the drawing, the insert 11 lies fully inside the bottom part 1, the main portion 12 in this example extending between the bottom wall 2 and the retaining device 7.

Figure 3:
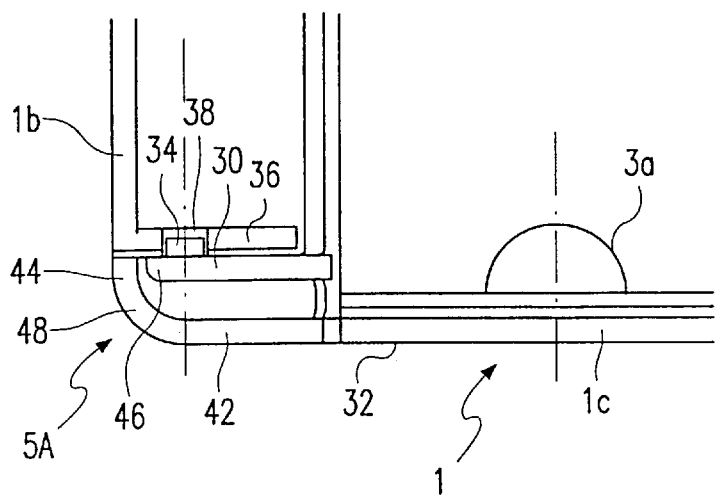
FIG. 3 shows a portion of the housing provided with a corner hinge on an enlarged scale.

The construction of the corner hinges 5A and 5B, which are basically identical, will be explained in more detail with reference to FIGS. 1, 2 and 3. Each of the corner hinges 5A and 5B comprises a recessed hinge arm 30 which forms part of the lid part 3 and which is recessed with respect to the respective lateral side 32 of the lid part 3. The hinge arms 30 are somewhat resilient in directions towards one another and away from one another and are each provided with a stud 34, said two studs 34 being present at mutually facing sides of the hinge arms 30. The hinges 5A and 5B each further comprise a recessed hinge wall 36 which forms part of the bottom part 1. The hinge walls 36, which lie recessed behind the lateral sides of the bottom part 1 formed by the side walls 1c, are provided with openings 38 into which the respective studs 34 are inserted. The bottom part is provided with corner recesses 40 to enable the placement of the hinge walls 36. The corner hinges 5A and 5B are present essentially in said corner recesses 40. To protect the corner hinges 5A and 5B, the lid part 3 is provided with protection walls 42 at its sides 32, adjacent the corner hinges 5A and 5B. The protection walls 42 extend at some distance from and for the major part parallel or substantially parallel to the hinge arms 30 and may be made somewhat resilient in transverse direction. In this example, the protection walls 42 are provided with free end portions 44 which are bent towards one another and which extend at some distance from the free ends 46 of the hinge arms 30. The free end portions 44 are connected to the remainder of the walls 42 via fluent bend portions 48 of the protection walls 42. The bend portions 48 extend through at least substantially 90° and form rounded transitions to the rear side formed by the rear wall 1b of the bottom part, thus forming two of the rounded corners 4 of the housing. The protection walls 42 are so positioned in the corner recesses 40 that they lie flush with the side walls 1c of the bottom part 1. Both the entire bottom part 1 and the entire lid part 3 form an integral injection-moulded product.

The housing according to the invention shown in FIGS. 4, 5A and 5B is designed, for example, for the storage of a DVD provided with video information. The dimensions of the housing in this example are: a depth d of 142 mm, a width w of 190 mm, and a height h of 10 mm. The housing is provided with a bottom part 101 and a lid part 103. In the bottom part there is a retaining device 107 comprising a more or less plate-shaped element 107a which is provided with a clamping member 107b for retaining an information carrier 120 with clamping force. The lid part 103 is connected to the bottom part 101 by means of two corner hinges 105A and 105B and is provided with two recessed hinge arms 130 which each lie recessed with respect to a side 132 of the lid part 103. The bottom part 101 is provided with two corner recesses 140 adapted to the hinge arms 130 and bounded by recessed hinge walls 136 which each lie recessed with respect to a side 110c of the bottom part 101. The hinge arms 130 extend in the corner recesses 140 such that the hinge arms 130 and the hinge walls 136 constitute said corner hinges 105A and 105B. The hinge arms 130 are provided with studs 134 here which project into openings 138 of the hinge walls 136. The lid 103 is in addition provided with two protection walls 142, each of the protection walls 142 lying opposite a respective hinge wall 130.

The protection walls 142 are each provided with a free end portion 144, said free end portions 144 being bent towards one another and each extending opposite to and at a distance from one of the hinge arms 130. Each of the projection walls 142 is in addition provided with a fluent bend portion 148 which merges into the end portion 144 such that rounded transitions are formed between the lateral sides 101c and the rear side 101b of the bottom part 101 when the housing is closed, so that the housing will have rounded corners at the areas of the corner recesses 140. To avoid sharp corners also at the front of the housing, the bottom part 101 and the lid part 103 are rounded at the transitions between their fronts and their lateral sides. Sturdy ridges 150 are provided between the hinge arms 130 and the protection walls 142 for reinforcement. The element 107a present in the bottom part 103 is detachably fastened to the bottom part 103, for example by means of two snap closure elements 151. The element 107a is provided with upright walls 153 which extend at some distance from transparent walls 155 of the bottom part 103. An information leaflet 111 extends between the bottom part 103 and the element 107a, upright portions 111a of the leaflet 111 lying protected between said walls 153 and said transparent walls 155. The element 107a is provided with a number, in this example four, of openings or recesses 157 so that the information disc 120 can be easily taken from the housing.

It is noted that the invention is not limited to the embodiments shown; thus, for example, the retaining device and/or some other component relevant to the invention may be constructed in a different manner.

It is also possible for the housing to be specifically adapted to different types of disc-shaped information carriers.

I claim:

1. A housing for storing a disc, the housing having a first part having two first-part lateral sides, a retaining device for retaining the disc, a second part having two second-part lateral sides, and two corner hinges connecting the first part to the second part, one of said parts being a bottom part and the other part being a lid part, and each corner hinge being formed by two hinge elements respectively, a first of said elements being a hinge arm connected to the first part and being adjacent a corresponding first-part lateral side, and a second of said elements being connected to the second part, characterized in that said hinge arm is recessed with respect to said corresponding first-part lateral side, the second part has two corner recesses aligned with the respective recessed hinge arms, said second of said elements being formed by a respective recessed hinge wall which is recessed with respect to a corresponding second-part lateral side, each hinge arm extending into a corresponding corner recess and being rotatably coupled to a respective recessed hinge wall to form a corner hinge, the first part further comprises two protection walls arranged such that each hinge arm extends between a respective protection wall and a respective hinge wall.

2. A housing as claimed in claim 1, wherein the second part has a rear side, each protection wall extends substantially along a corresponding first-part lateral side, and in a closed condition of the housing said second-part lateral sides extend toward said first part lateral sides, characterized in that each of the protection walls has a free end portion and a fluent curved portion which merges into the free end portion and, at least when the first part is in a closed position, form a rounded transition between one of the second-part lateral sides and the rear side of the second part.

3. A housing as claimed in claim 1, characterized in that said first part is said lid part, said second part is said bottom part, and said retaining device is disposed in said bottom part.

4. A housing as claimed in claim 3, characterized in that one of said elements further comprises an opening, and the other of said elements further comprises a stud which projects into the opening of the corresponding one of said elements.

5. A housing as claimed in claim 3, characterized in that said hinge walls are rigid, and the hinge arms are resilient in a direction along a line extending between the two hinge arms.

6. A housing as claimed in claim 3, characterized in that the protection walls are of a resilient construction.

7. A housing as claimed in claim 3, characterized in that the protection walls extend into corresponding corner recesses of the bottom part.

8. A housing as claimed in claim 3, characterized in that each of the protection walls has a respective free end portion, said free end portions being bent toward one another and extending opposite, and spaced a distance from, a free end of a respective one of the hinge arms.

9. A housing as claimed in claim 8, wherein the bottom part has a rear side, characterized in that each of the protection walls has a fluent curved portion which merges into the free end portion and, at least when the lid part is in a closed position, forms a rounded transition between one of the bottom lateral sides and the rear side of the bottom part.

10. A housing for storing a disc-shaped information carrier, the housing having a bottom part comprising two bottom lateral sides, a resilient central clamping device for retaining the disc, and a lid part having two top lateral sides, and two corner hinges connecting the lid part to the bottom part, in a closed condition of the housing said bottom part lateral sides extending toward said lid part lateral sides, each corner hinge being formed by two hinge elements respectively, a first of said elements being a hinge arm connected to the lid part and being adjacent a corresponding top lateral side, and a second of said elements being connected to the bottom part, characterized in that said first of said hinge elements is recessed with respect to said corresponding top lateral side, the bottom part has two corner recesses aligned with the respective recessed hinge arms, said second of said elements being formed by a respective recessed hinge wall which is recessed with respect to a corresponding bottom lateral side, each hinge arm extending into a corresponding corner recess and being rotatably coupled to a respective recessed hinge wall to form a corner hinge, the lid part further comprises two protection walls arranged such that each hinge arm extends between a respective protection wall and a respective hinge wall.

11. A housing as claimed in claim 10, characterized in that one of said elements further comprises an opening, and the other of said elements further comprises a stud which projects into the opening of the corresponding one of said elements.

12. A housing as claimed in claim 10, characterized in that said hinge walls are rigid, and the hinge arms are resilient in a direction along a line extending between the two hinge arms.

13. A housing as claimed in claim 10, characterized in that the protection walls are of a resilient construction.

14. A housing as claimed in claim 10, characterized in that the protection walls extend into corresponding corner recesses of the bottom part.

15. A housing as claimed in claim 10, characterized in that each of the protection walls has a respective free end portion, said free end portions being bent toward one another and extending opposite, and spaced a distance from, a free end of a respective one of the hinge arms.

16. A housing as claimed in claim 10, characterized in that the bottom part and the lid part have rounded front corners.

17. A housing as claimed in claim 10, characterized in that the lid part includes interior tags extending from respective top lateral walls toward each other, for retaining an inserted document.

18. A housing as claimed in claim 10, wherein the bottom part has a rear side, characterized in that each of the protection walls has a respective free end portion and a fluent curved portion which merges into the respective free end portion and, at least when the lid part is in a closed position, form a rounded transition between one of the bottom lateral sides and the rear side of the bottom part.

19. A housing as claimed in claim 18, characterized in that the protection walls are of a resilient construction.

20. A housing as claimed in claim 19, characterized in that the lid part is an injection-molded product.

\* \* \* \* \*